Nov. 3, 1942.    W. A. RAY    2,300,807
CONTROL DEVICE
Filed July 10, 1939
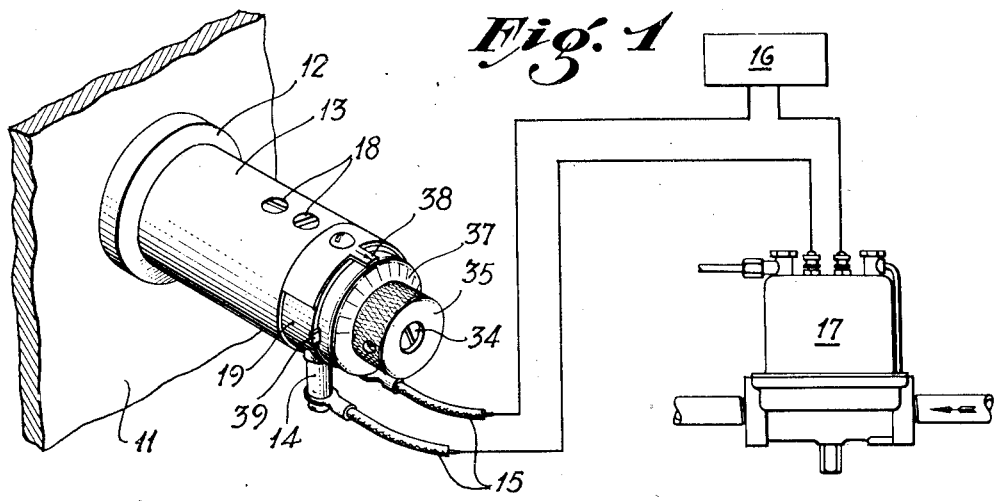
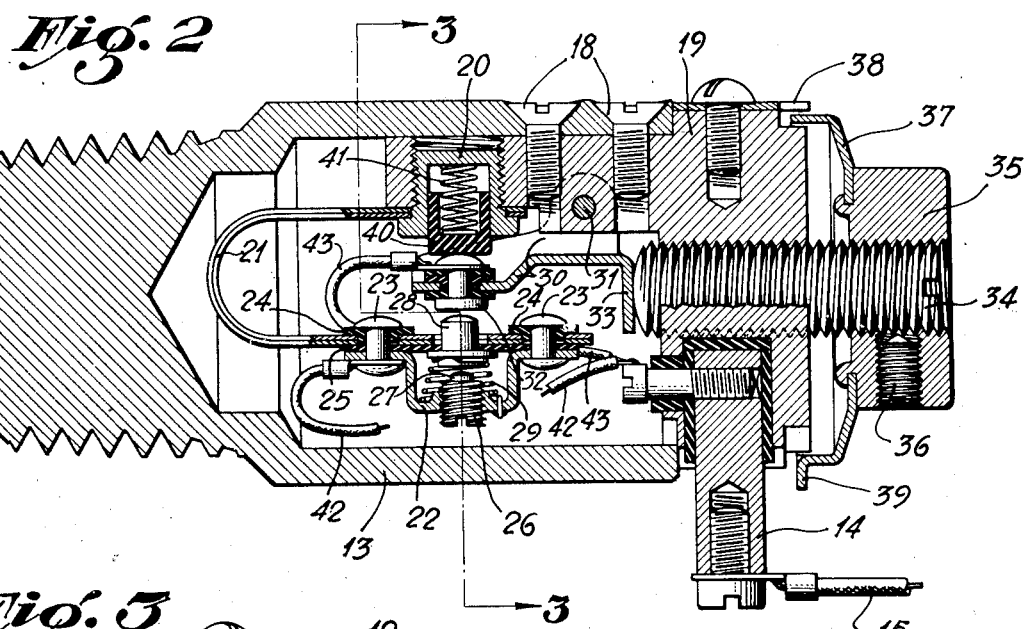
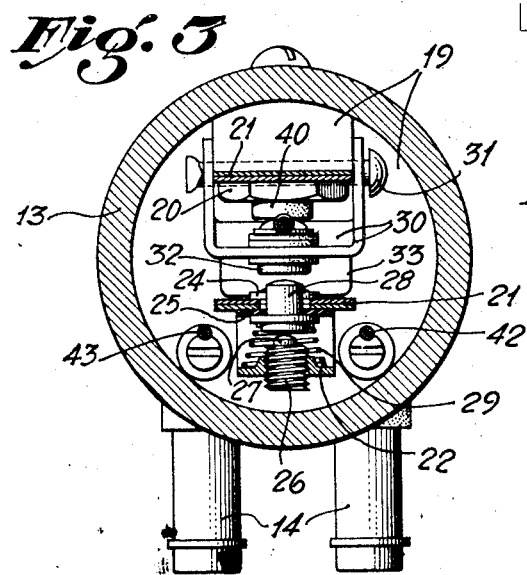
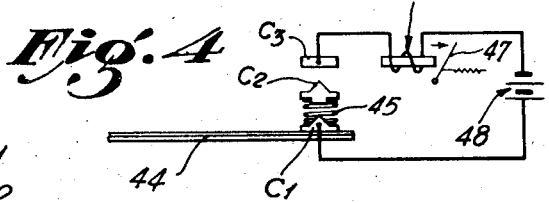
WILLIAM A. RAY, INVENTOR;
BY John H. Rouse,
ATTORNEY.

Patented Nov. 3, 1942

2,300,807

UNITED STATES PATENT OFFICE 2,300,807

CONTROL DEVICE

William A. Ray, Glendale, Calif.

Application July 10, 1939, Serial No. 283,575

3 Claims. (Cl. 201—48)

My present invention relates to electrical control systems in which circuit controlling contacts are progressively moved, as by means responsive to change in a physical condition.

It is an object of my invention to provide in such a system a novel control device wherein circuit controlling contacts are so arranged that, in normal movement thereof in one direction, a circuit is first established through a limiting resistance forming part of the device and, upon continued movement, said resistance is short-circuited. Upon movement in the opposite direction, the limiting resistance is again connected in the circuit, and, upon continued movement, the circuit is opened.

It is a further object of my invention to provide, in a device of the character described, biasing means for a contact member, which means also functions as a limiting resistance for the controlled circuit.

Another object of my invention is the provision of a control device of the character described which is simple, compact, effective and relatively inexpensive to manufacture, and which, while not so limited, has particular utility in the thermostatic control of a heating device, such as a water boiler.

Inherent advantages of the device of my invention reside in the reduction of arcing at the contacts, and also in the production of a definite differential of operation of electrical translating means in which a predetermined amount of current is required for operation of the same to one position but a less amount of current suffices to maintain the means in said position, when such translating means is connected in a circuit controlled by the device of my invention.

Other objects and advantages of the invention will be found in the description, the drawing, and the appended claims.

For complete understanding of my invention, reference may be had to the following detailed description and accompanying drawing, wherein:

Figure 1 is a perspective view of a control device embodying my invention, shown diagrammatically associated with other apparatus;

Figure 2 is an enlarged sectional view of the control device shown in Fig. 1;

Figure 3 is a section taken along the irregular line 3—3 of Fig. 2; and

Figure 4 is a diagrammatic view of a control circuit according to my invention.

Referring first to Fig. 1 of the drawing, the numeral 11 indicates the wall of a heating device, such as a water boiler, having an internally threaded boss 12 for receiving an electrical control device casing 13 provided with insulated terminals 14 to which are connected by wires 15 a source of electrical energy 16 and an electrically operated valve 17.

This valve, which is adapted to control fuel supply to the heating device, is shown by way of example only and is fully described in my co-pending application, Serial No. 222,673, filed August 2, 1938. It is of the fluid pressure operated, pilot valve controlled type, employing electromagnetic means for actuating the pilot valve, which means include a pilot valve member biased to one controlling position and movable into another controlling position upon energization of said electromagnetic means sufficient to overcome said bias.

Referring now more particularly to Figs. 2 and 3, mounted in the casing 13, and secured thereto by screws 18, is a generally cylindrical member 19 to the inner portion of which is secured, by a hollow screw 20, a U-shaped bimetallic member 21 which carries on its lower end portion a U-shaped bracket 22 which is secured to the bimetallic member by rivets 23 and is electrically insulated from the member by washers 24 and strip 25.

Threaded in an upset portion of the bracket 22 is a screw 26 provided in its upper end with a first electrical contact member 27. A second contact member 28 freely extends through openings in the bimetallic member 21 and insulating strip 25 and is urged upwardly by the force of a compression spring 29 which is soldered or welded at its ends to the second contact member 28 and to the bracket 22. This spring is preferably of metal having a high coefficient of resistance, such as stainless steel.

A lever 30, pivotally connected to the member 19 by a pin 31, insulatingly supports a third contact member 32. The lever 30 is provided with a downwardly bent rear portion 33 which is engaged by the inner end of an adjusting screw 34, screw-threaded in member 19, and having a threaded knob 35 which is locked in adjusted position on screw 34 by a set screw 36. Secured to the knob 35 is a temperature indicating dial 37 cooperating with a fixed pointer 38. Rotation of knob 35 is limited by the engagement of an upturned portion 39 of dial 37 with the pointer 38. An insulating button 40, urged by a compression spring 41 into engagement with the upper end of third contact member 32, maintains the rear portion of lever 30 in contact with the inner end of screw 34.

Electrical connection of the first contact 27 and of the third contact 32 with the insulated terminals 14 is made by wires 42 and 43, respectively.

Referring now to the diagrammatic view of Fig. 4, the numeral 44 indicates a bimetallic member carrying a first contact $C_1$ to which is connected, by spring 45, a second contact $C_2$ cooperable with a fixed third contact $C_3$. An electromagnetic translating device 46, including a movable armature 47, and a source of electrical energy 48 are connected in circuit with the first and the third contacts.

The operation of the control system will be more readily understood by reference to Fig. 4.

Assuming that the bimetallic member 44 is so arranged that upon decrease in temperature it tends to move the contacts carried by it upward, upon engagement of contact $C_2$ with contact $C_3$ a circuit is then completed through the translating device 46, the source 48, contact $C_1$, spring 45 and contacts $C_2$ and $C_3$. The constants of the circuit are so arranged that, on account of the limiting resistance of spring 45, insufficient current is passed to energize the electromagnet 46 to attract its armature 47.

Upon continued movement of the bimetallic member, the spring 45 is compressed, permitting engagement of contacts $C_2$ and $C_1$. The resistance of spring 45 now being short-circuited, sufficient current flows in the circuit to cause the electromagnet to attract its armature.

Assuming that the armature in its attracted position completes an external circuit to open an electrically operated valve controlling fuel supply to a heating device with which the bimetallic member is associated (or, that the armature directly controls a pilot valve as in the device 17), upon the resulting increase in temperature, the bimetallic member will now move in a downward direction. When the contacts $C_1$ and $C_2$ separate, the resistance of the spring 45 will again be introduced in the circuit and the current therethrough accordingly reduced. However, as is common with such electromagnetic devices as are here shown, the reduced current suffices to maintain the armature in attracted position. Upon continued movement of the bimetallic member, the contacts $C_2$ and $C_3$ separate, opening the circuit and permitting the armature to drop out.

It will be seen that thus arcing at the contacts, particularly as may be caused by "fluttering," is minimized, and also that a definite differential of operation of the translating device is effected—dependent upon the predetermined position of contact $C_2$ with respect to contact $C_3$.

The operation of the device shown in Fig. 2 is identical with that just described, the first, second and third contacts (27, 28 and 32) corresponding to contacts $C_1$, $C_2$ and $C_3$, respectively, and spring 29 to spring 45.

In a practical embodiment of my invention, the spring 29 or 45, of stainless steel, has a resistance of seven ohms. This value is suitable for use in circuit with an electromagnetic device having two ohms coil resistance and a thermoelectric generating device having one ohm internal resistance and an E. M. F. of approximately 0.25 volt.

Obviously, spring resistances may be chosen suitable for the operation of other electrical circuits and my invention also comprehends the use of resilient members of material having high specific resistance for biasing the first and the second contacts apart. Such members may take the form of, for example, hollow resilient pads or elongated bent strips of fibrous material impregnated with a conducting matter such as carbon.

The predetermined temperature for operation of the translating device is determined by movement of screw 34, which effects variation of the relatively fixed position of the third contact 32 with respect to the other contacts. Determination of the differential of operation of the translating device is effected by movement of screw 26 to bring the first contact nearer to or further from the second contact.

While the device of my present invention has particular utility in the control of electromagnetic translating devices, such as herein described, it is not so limited as other electric devices such as, for example, a heat motor may be efficiently controlled by it.

And while I have herein shown and described a specific embodiment of my invention by way of illustration, it is to be understood that modifications may be made without departing from the spirit of my invention. I intend therefore that my invention be limited only by the scope of the appended claims.

I claim as my invention:

1. In an electrical control device, a member movable in response to change in a condition, a first electrical contact member carried by said movable member, a second electrical contact member, a resilient electrical conducting member of material having high specific resistance connected to said second and to said first contact members and urging them apart, a third electrical contact member relatively fixed with respect to said movable member and so positioned as to be engaged by said second contact when said movable member is moved in one direction, said second and said first contact members being so positioned as to directly engage with one another upon continued movement of said movable member in said one direction and after engagement of said third and said second contacts, and means for connecting said first and said third contacts in an electrical circuit.

2. In an electrical control device, a member movable in response to change in a condition, a first electrical contact member carried by said movable member, a second electrical contact member, a spring of metal having high specific resistance connected to said second and to said first contact members and urging them apart, a third electrical contact member relatively fixed with respect to said movable member and so positioned as to be engaged by said second contact when said movable member is moved in one direction, said second and said first contact members being so positioned as to directly engage with one another upon continued movement of said movable member in said one direction and after engagement of said third and said second contacts, means for adjustably moving said third contact with respect to said second contact, and means for connecting said first and said third contacts in an electrical circuit.

3. In an electrical control device, a casing adapted to be mounted in heat conducting relation to a heating device, a thermostatic member secured within said casing and movable in response to change in temperature of said heating device, a first contact member carried by said movable member, a second contact member, a spring of metal having high specific resistance connected to said second and to said first contact members and urging them apart, a third contact member relatively fixed with respect to said movable member and so positioned as to be engaged by said second contact when said movable member is moved in one direction, said second and said first contact members being so positioned as to directly engage with one another upon continued movement of said movable member in said one direction and after engagement of said third and said second contacts, means for adjustably moving said third contact with respect to said second contact, means for adjustably moving said first contact with respect to said second contact, and means for connecting said first and said third contacts in an electrical circuit.

WILLIAM A. RAY.